United States Patent
Ha et al.

(10) Patent No.: US 8,034,476 B2
(45) Date of Patent: Oct. 11, 2011

(54) BATTERY MODULE, AND MIDDLE OR LARGE-SIZED BATTERY PACK CONTAINING THE SAME

(75) Inventors: Jin Woong Ha, Daejeon (KR); Jeeho Kim, Daejeon (KR); Yongshik Shin, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/310,872

(22) PCT Filed: Sep. 6, 2007

(86) PCT No.: PCT/KR2007/004291
§ 371 (c)(1),
(2), (4) Date: Oct. 21, 2009

(87) PCT Pub. No.: WO2008/035872
PCT Pub. Date: Mar. 27, 2008

(65) Prior Publication Data
US 2010/0151299 A1 Jun. 17, 2010

(30) Foreign Application Priority Data

Sep. 18, 2006 (KR) .................... 10-2006-0089898

(51) Int. Cl.
*H01M 10/38* (2006.01)
*H01M 6/42* (2006.01)
*B60K 1/00* (2006.01)
*B60K 6/20* (2006.01)

(52) U.S. Cl. ............ 429/123; 429/151; 429/90; 429/92; 180/65.1; 180/65.21

(58) Field of Classification Search ................ 429/123, 429/90, 92, 151; 180/65.1, 65.21
See application file for complete search history.

(56) References Cited

U.S. PATENT DOCUMENTS

| 3,338,452 | A | * | 8/1967 | Oakley et al. ................ 220/23.4 |
| 4,347,294 | A | | 8/1982 | Mejia |
| 5,747,186 | A | | 5/1998 | Morishita et al. |
| 5,831,350 | A | * | 11/1998 | McConkey et al. ........... 307/150 |
| 5,981,101 | A | | 11/1999 | Stone |
| 2006/0177733 | A1 | * | 8/2006 | Ha et al. ....................... 429/159 |

OTHER PUBLICATIONS

International Search Report, PCT/KR2006/004291.

* cited by examiner

*Primary Examiner* — Patrick Ryan
*Assistant Examiner* — Julian Anthony
(74) *Attorney, Agent, or Firm* — Lerner, David, Littenberg, Krumholz & Mentlik, LLP

(57) ABSTRACT

Disclosed herein are a battery module constructed in a structure in which a plurality of plate-shaped secondary battery cells ('battery cells'), which can be charged and discharged, are sequentially stacked on a lower plate, and an upper plate is coupled to the uppermost battery cell, wherein the plates are provided at the top and bottom and/or the right and left sides thereof with a sliding coupling structure, and the battery module is provided at the front thereof with grips, and a middle- or large-sized battery pack including a plurality of battery modules.

16 Claims, 7 Drawing Sheets

BATTERY MODULE, AND MIDDLE OR LARGE-SIZED BATTERY PACK CONTAINING THE SAME

CROSS REFERENCE TO RELATED APPLICATIONS

The present application is a national phase entry under 35 U.S.C. §371 of International Application No. PCT/KR2007/004291, filed Sep. 6, 2007, published in English, which claims the benefit of Korean Patent Application No. 10-2006-0089898, filed Sep. 18, 2006. The disclosures of said applications are incorporated by reference herein.

FIELD OF THE INVENTION

The present invention relates to a battery module including a sliding coupling structure, and a battery pack including a plurality of battery modules. More particularly, the present invention relates to a battery module constructed in a structure in which a plurality of plate-shaped secondary battery cells ('battery cells'), which can be charged and discharged, are sequentially stacked on a lower plate, and an upper plate is coupled to the uppermost battery cell, wherein the plates are provided at the top and bottom and/or the right and left sides thereof with a sliding coupling structure, and a middle- or large-sized battery pack including the same.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, middle- or large-sized devices, such as vehicles, use a middle- or large-sized battery module having a plurality of battery cells electrically connected with each other because high output and large capacity are necessary for the middle- or large-sized devices.

Preferably, the middle- or large-sized battery module is manufactured with small size and small weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

For the middle- or large-sized battery module to provide output and capacity required by a predetermined apparatus or device, it is necessary for the middle- or large-sized battery module to be constructed in a structure in which a plurality of battery cells are electrically connected in series with each other, and the battery cells are stable against an external force.

Consequently, when a middle- or large-sized battery module is constructed using a plurality of battery cells, a plurality of members for mechanical coupling and electrical connection between the battery cells are generally needed, and, as a result, a process for assembling the mechanical coupling and electrical connection members is very complicated. Furthermore, there is needed a space for coupling, welding, or soldering the mechanical coupling and electrical connection members, with the result that the total size of the system is increased. The increase in size of the system is not preferred in the aspect of the spatial limit of an apparatus or device in which the middle- or large-sized battery module is mounted. Furthermore, the middle- or large-sized battery module must be constructed in a more compact structure in order that the middle- or large-sized battery module is effectively mounted in a limited inner space, such as a vehicle.

In addition, when some of the battery modules, constituting the middle- or large-sized battery module, are abnormal, it takes a large amount of time and a large number of processes during the disassembly and assembly of the battery modules to replace the abnormal battery modules with new ones. Also, additional members may be mounted to improve the work efficiency; however, these members may act as a factor increasing the size of the battery module.

Consequently, there is a high necessity for a battery module assembly that is more compact, structurally stable, and easily disassembled and assembled, as previously described.

SUMMARY OF THE INVENTION

Therefore, the present invention has been made to solve the above problems, and other technical problems that have yet to be resolved.

Specifically, it is an object of the present invention to provide a battery module having a compact structure in which the battery module is stably mounted in a limited space, such as a vehicle, and that is easily assembled and disassembled, thereby improving the work efficiency, and a middle- or large-sized battery pack including the same.

In accordance with one aspect of the present invention, the above and other objects can be accomplished by the provision of a battery module constructed in a structure in which a plurality of plate-shaped secondary battery cells ('battery cells'), which can be charged and discharged, are sequentially stacked on a lower plate, and an upper plate is coupled to the uppermost battery cell, wherein the plates are provided at the top and bottom and/or the right and left sides thereof with a sliding coupling structure.

The plates are not particularly restricted so long as the plates are constructed in a structure in which the unit cells are stacked. The plates may be constructed in a case structure (an upper case and a lower case) having a receiving part corresponding to the size of the battery cells such that the battery cells are easily mounted in the receiving part. Preferably, the cases are constructed in a separate structure in which the cases cover the top and bottom of the stacked battery cells, respectively.

In a preferred embodiment, the battery module according to the present invention includes a rectangular lower case including an upper end receiving part in which the battery cells are sequentially stacked, a rectangular upper case including a lower end receiving part for covering the battery cells stacked on the lower case, a first circuit unit for electrically connecting the stacked battery cells to each other, the first circuit unit including a sensing board assembly for detecting the voltage and/or current of the battery cells, a second circuit unit electrically connected to the first circuit unit, the second circuit unit including a main board assembly for controlling the overall operation of the battery module, and a third circuit unit electrically connected to the second circuit unit, the third circuit unit being connected to an external output terminal while preventing the overcurrent.

The battery module according to the present invention is constructed generally in a compact structure. Specifically, the width of the completed battery module is almost equal to or slightly greater than that of each unit cell. The length of the battery module is greater, by the widths of the first circuit unit and the third circuit unit, than that of each unit cell. The thickness of the battery module is the sum of the thickness of the stacked unit cells, the thickness of the second circuit unit, and the thicknesses of the upper and lower cases. Consequently, the battery module according to the present invention has a size less than that of any conventional battery modules, and therefore, the battery module according to the present invention is effectively mounted in an external apparatus or device to which the battery module according to the present invention will be applied.

Each unit cell is not particularly restricted so long as the unit cell is a secondary battery that can be charged and discharged. For example, a lithium secondary battery, a nickel-metal hydride (Ni-MH) battery, a nickel-cadmium (Ni—Cd) battery may be used as the unit cell. Among them, the lithium secondary battery is preferably used as the unit cell because the lithium secondary battery exhibits a high output to weight ratio. Based on its shape, the lithium secondary battery may be classified as a cylindrical battery, a prismatic battery, or a pouch-shaped battery. Among them, the prismatic battery or the pouch-shaped battery are preferably used as the unit cell because the prismatic battery or the pouch-shaped battery can be stacked with high integration. More preferably, the pouch-shaped battery is used as the unit cell because the weight of the pouch-shaped battery is very small.

In the battery module according to the present invention, the upper case and the lower case are separated from each other. Consequently, when the capacity and output of the battery module need to be changed according to circumstances, it is possible to add or remove the unit cells between the upper case and the lower case, and therefore, the flexible design of the battery module is accomplished.

The overall size of the upper case and the lower case is approximately equivalent to that of each unit cell. Consequently, the upper end receiving part of the lower case and the lower end receiving part of the upper case, in which the unit cells are received, correspond to the size of the cell body of each unit cell.

The first circuit unit is mounted to the front of the battery module adjacent to electrode terminals of the unit cells. The first circuit unit includes connection terminals for connecting the unit cells in parallel or series with each other, the sensing board assembly of the first circuit unit receives voltage and current signals from the respective unit cells and detects the temperature of the battery. The temperature of the battery may be measured by the sensing board assembly as the overall temperature of the battery module or the temperatures of the respective unit cells.

The construction of the connection members is not particularly restricted so long as the unit cells are connected in parallel or series with each other by the connection members. Preferably, a safety element, for interrupting current when overcurrent or overheat is generated, is connected between the connection members. The safety element may be, for example, a fuse, a bimetal, or a positive temperature coefficient (PTC) element.

Preferably, the sensing board assembly is made of a printed circuit board (PCB), and the sensing board assembly is electrically connected to the respective unit cells.

The unit cells are electrically connected to the second circuit unit, which is mounted at the lower end receiving part of the upper case, via the first circuit unit. The operation of the battery module is controlled by the main board assembly of the second circuit unit.

The third circuit unit, which is electrically connected to the second circuit unit, is mounted to the other side opposite to the side of the battery module where the first circuit unit is mounted. The third circuit unit is the final element of the battery module, which is connected to an external device for controlling the overcharge, overdischarge, and overcurrent of the unit cells. The control of the overcharge, overdischarge, and overcurrent of the unit cells may be performed by a switching element included in the third circuit unit.

Preferably, the main board assembly is made of a PCB. Consequently, the main board assembly of the second circuit unit has a specific strength sufficient to protect the unit cells against the external impacts. According to circumstances, therefore, a safety member, including the second circuit unit, may be mounted only to the upper case.

The battery module is constructed in a structure in which the circuit units for controlling the operation of the unit cells are connected to each other such that the circuit units surround the battery module. Consequently, the overall size of the battery module is greatly reduced.

The third circuit unit includes a switching element for controlling the overcurrent during the charge and discharge of the battery cells, and the third circuit unit is mounted at the rear of the battery module opposite to electrode terminals of the battery cells.

The switching element is connected in series, to the unit cells, constituting the battery module, for controlling the current flowing in the unit cells. The switching element is connected to a protection circuit for detecting the voltage and/or the current of the unit cells to control the switching element. The switching element is not particularly restricted so long as the switching element controls overcharge, overdischarge, and overcurrent of the unit cells. For example, an FET element or a transistor may be used as the switching element. Preferably, the FET element is used as the switching element.

The switching element is connected to a control circuit for detecting the voltage and/or the current of the unit cells to control the switching element. The switching element is controlled on or off according to a signal outputted from the control circuit.

The module case has a sliding coupling structure. The sliding coupling structure includes sliding grooves formed at the top of the upper case in the longitudinal direction of the upper case and corresponding sliding protrusions formed at the bottom of the lower case in the longitudinal direction of the lower case. Consequently, when two or more battery modules are stacked in the height direction, the sliding protrusions formed at the bottom of the upper battery module are located in the corresponding sliding grooves formed at the top of the lower battery module, and then the upper battery module is slid in the longitudinal direction, with the result that the mechanical coupling between the battery modules is accomplished through the sliding coupling structure without using additional connection members.

The sliding coupling structure may be constructed in various constructions, preferred examples of which will be described below.

The sliding grooves may be formed at the right and left sides of the top of the upper case, and the sliding protrusions may be formed at the right and left sides of the bottom of the lower case, to maximize the coupling force of the sliding coupling structure. Especially, the sliding grooves and the sliding protrusions are preferably constructed in a linear motion (LM) rail and block structure.

The front end of each sliding groove may have a width larger than that of the corresponding sliding protrusion, such that the assembly position error is allowed during the coupling, whereby the assembly efficiency and speed are improved. Also, the front end of each sliding groove may be formed at a relatively high height such that the coupling is stably and securely maintained.

Each sliding groove is provided at the rear end thereof with a stopping wall for stopping further movement of the corresponding sliding protrusion after the sliding protrusions are completely engaged in the corresponding sliding grooves during the coupling between the battery modules, thereby accomplishing the correct coupling between the battery modules at a predetermined position.

Also, the battery module case is provided at the front thereof with depressed grips, by which the assembly and disassembly of the battery modules are easily performed. Preferably, the lower case is provided at the front thereof with depressed grips.

In accordance with another aspect of the present invention, there is provided a middle- or large-sized battery pack having a high output and large capacity, which includes a plurality of battery modules.

The middle- or large-sized battery pack according to the present invention may be used in various applications. For example, the middle- or large-sized battery pack according to the present invention may be used as a power source for vehicles, such as electric bicycles (E-bike), electric motorcycles, electric vehicles, and hybrid electric vehicles, or a power source for various applications and products, including industrial or domestic apparatuses. The middle- or large-sized battery pack according to the present invention is constructed in a compact structure and in a structure in which the assembly and disassembly of the battery pack is easily performed to obtain a desired capacity of the battery pack. Consequently, the middle- or large-sized battery pack according to the present invention is preferably used as a charging and discharging power source for electric vehicles.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
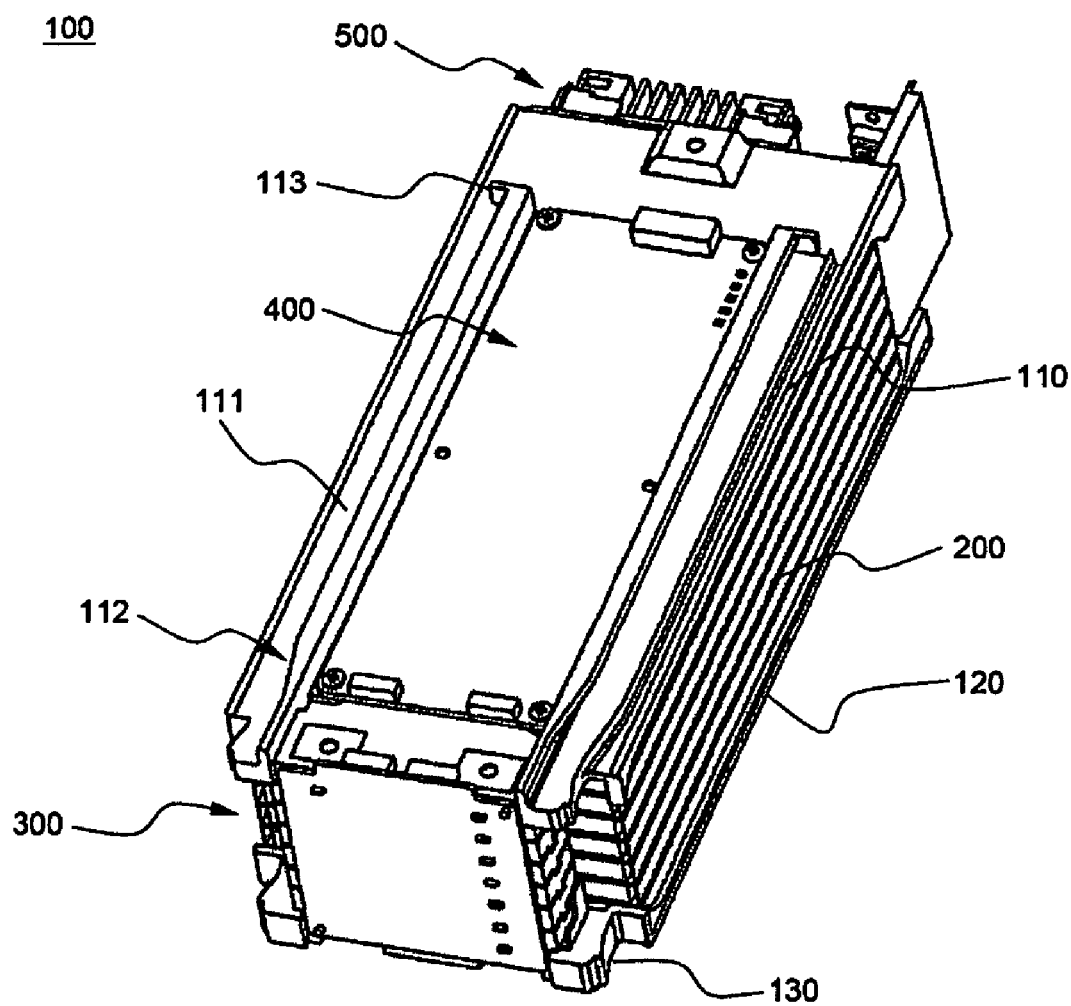
FIGS. 1 and 2 are perspective views illustrating the top and bottom of a battery module according to a preferred embodiment of the present invention, respectively.

FIG. 1 is a perspective view typically illustrating a battery module according to a preferred embodiment of the present invention.

Referring to FIG. 1, the battery module 100 includes an upper case 110, a lower case 120, a plurality of unit cells 200, a first circuit unit 300, a second circuit unit 400, and a third circuit unit 500. The unit cells 200 are stacked between the upper case 110 and the lower case 120, which are separated from each other. The first circuit unit 300 is located at the front of the battery module 100, the second circuit unit 400 is located at the bottom of the battery module 100, and the third circuit unit 500 is located at the rear of the battery module 100.

Since the upper case 110 and the lower case 120 are separated from each other, the number of the unit cells 200, which are stackable, is not limited by the upper case 110 or the lower case 120. Consequently, it is possible to easily design the battery module 100, such that the battery module 100 has a desired electrical capacity and output, by modifying the first circuit unit 300 and the third circuit unit 500 depending upon the number of the stacked unit cells 200. Also, the unit cells 200 are exposed to the outside, and therefore, heat dissipation is efficiently accomplished during the charge and discharge of the unit cells 200.

The first circuit unit 300 is mounted to one side of the battery module 100 adjacent to electrode terminals of the unit cells 200. The first circuit unit 300 includes a sensing board assembly for connecting the unit cells 200 in parallel or series with each other and detecting the voltages of the respective unit cells 200 according to the present invention.

The unit cells 200 are electrically connected to the second circuit unit 400, which is mounted at the top of the upper case 110, via the first circuit unit 300. The operation of the battery module 100 is controlled by a main board assembly of the second circuit unit 400.

The third circuit unit 500, which is electrically connected to the second circuit unit 400, is mounted to the other side opposite to the side of the battery module where the first circuit unit 300 is mounted. The third circuit unit 500 is the final element of the battery module 100, which is connected to an external device (not shown) for controlling the overcharge, overdischarge, and overcurrent of the unit cells. The control of the overcharge, overdischarge, and overcurrent of the unit cells may be performed by a switching element (not shown), such as a field effect transistor (FET), included in the third circuit unit 500.

At the top of the upper case 110 are formed sliding grooves 111, which extend along opposite sides of the upper case 110 in the longitudinal direction of the upper case 110. The front end 112 of each sliding groove 111 has a width larger than that of a corresponding sliding protrusion (not shown). Also, the front end 112 of each sliding groove 111 is formed at a relatively high height such that the coupling is stably and securely maintained.

At the rear end of each sliding groove 111 is formed a stopping wall 113 for stopping further movement of the corresponding sliding protrusion. Consequently, when two or more battery modules 100 are stacked, it is possible to stably couple the battery modules at a correct position.

Also, the battery module 100 is provided at opposite sides of the front thereof with depressed grips 130, which improves the work efficiency during the assembly and disassembly of the battery module 100.

Figure 2:
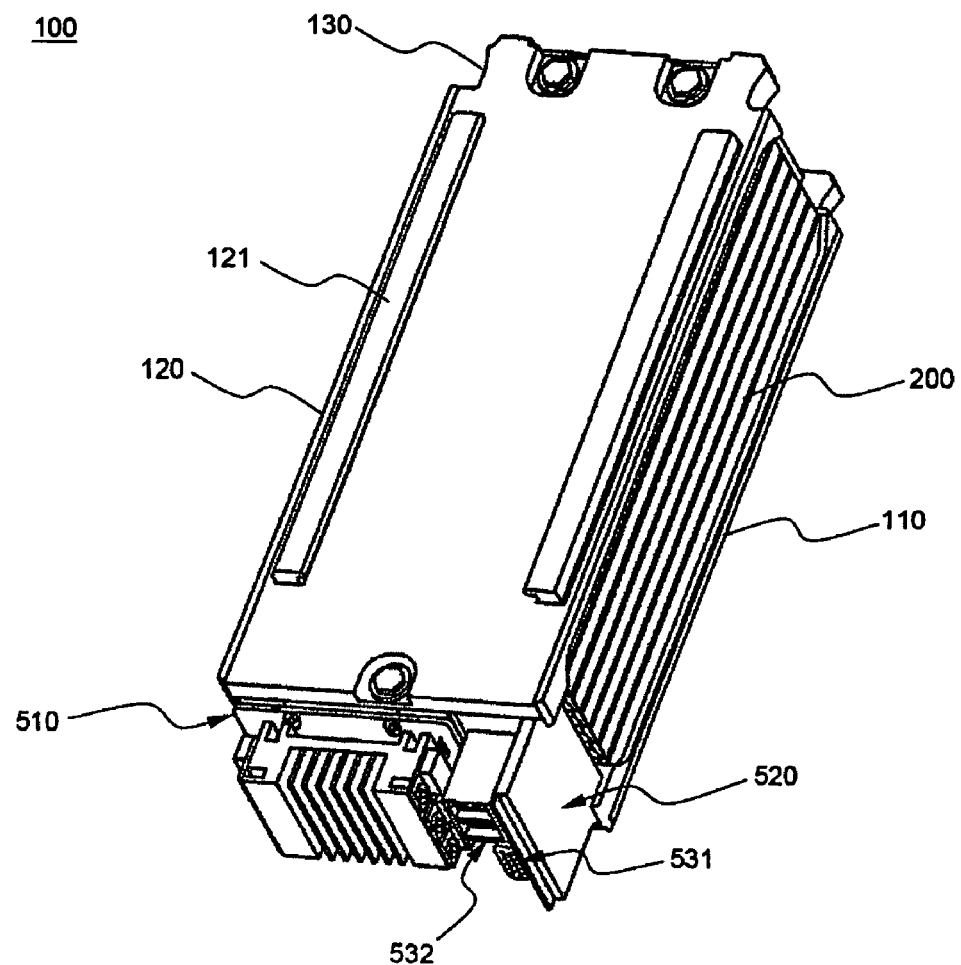

FIG. 2 is a perspective view illustrating the bottom of the battery module shown in FIG. 1.

Referring to FIG. 2, the lower case 120 of the battery module is provided at the bottom thereof with sliding protrusions 121, which extend along opposite sides of the lower case 120 in the longitudinal direction of the lower case 120. At the front of the lower case 120 are formed depressed grips 130. The sliding protrusions 121 are engaged in the corresponding sliding grooves (not shown), which are formed at the top of the upper case 110, whereby the mechanical coupling between the battery modules is accomplished.

Also, the battery module 100 is provided at the front thereof with various connectors and other members, including a switching board and a heat dissipation structure, which will be described below in more detail with reference to FIG. 3.

Figure 3:
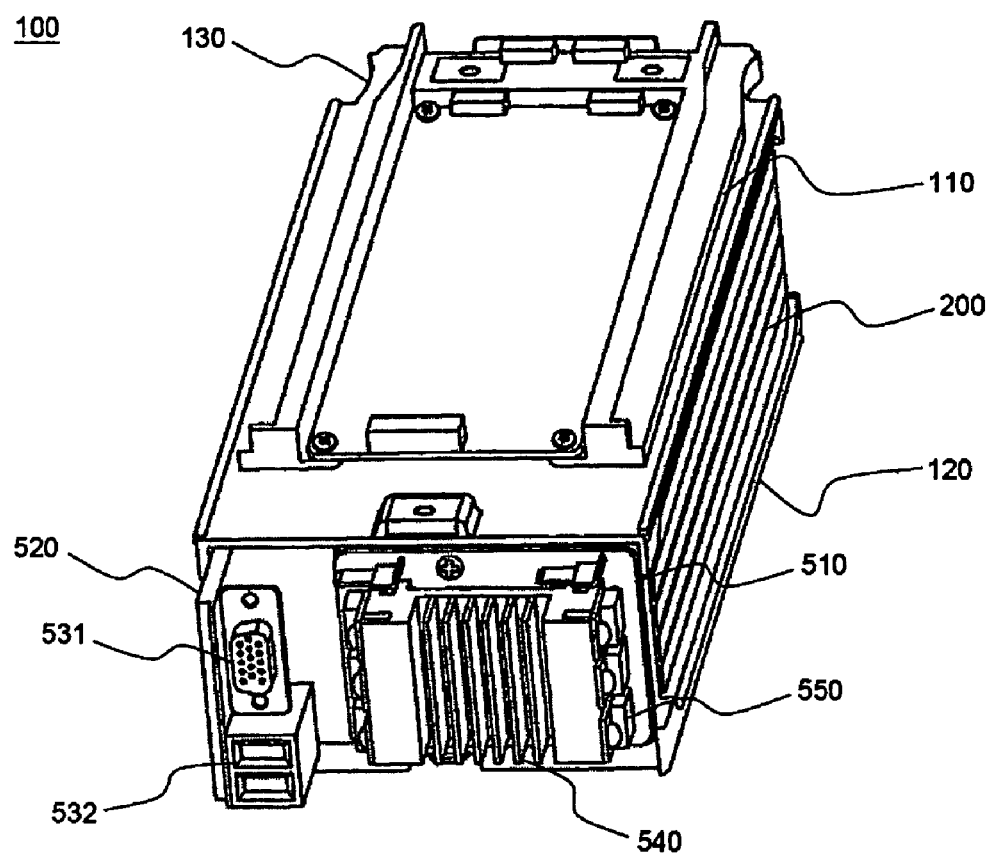
FIG. 3 is a perspective view illustrating the rear of the battery module according to the preferred embodiment of the present invention.

FIG. 3 is a perspective view illustrating the rear of the battery module shown in FIG. 1.

Referring to FIG. 3, the switching board is constructed in a structure in which a rectangular heat dissipation structure 540 is mounted on a printed circuit board (PCB) 510 while the heat dissipation structure 540 is connected to six FET elements 550, which are switching elements.

The heat dissipation structure 540 is constructed in a structure in which the FET elements 550 are coupled to opposite side frames of the heat dissipation structure 540, and a plurality of heat dissipation ribs protrude upward from a main frame integrally connected to the side frames.

At the left side of the heat dissipation structure 540 is formed a connector supporting member 520, which extends in the longitudinal direction of the battery module 100. On the connector supporting member 520 are mounted a communication connector 531 and a power connector 532, through which the battery module 100 is electrically connected to an external circuit.

Figure 4:
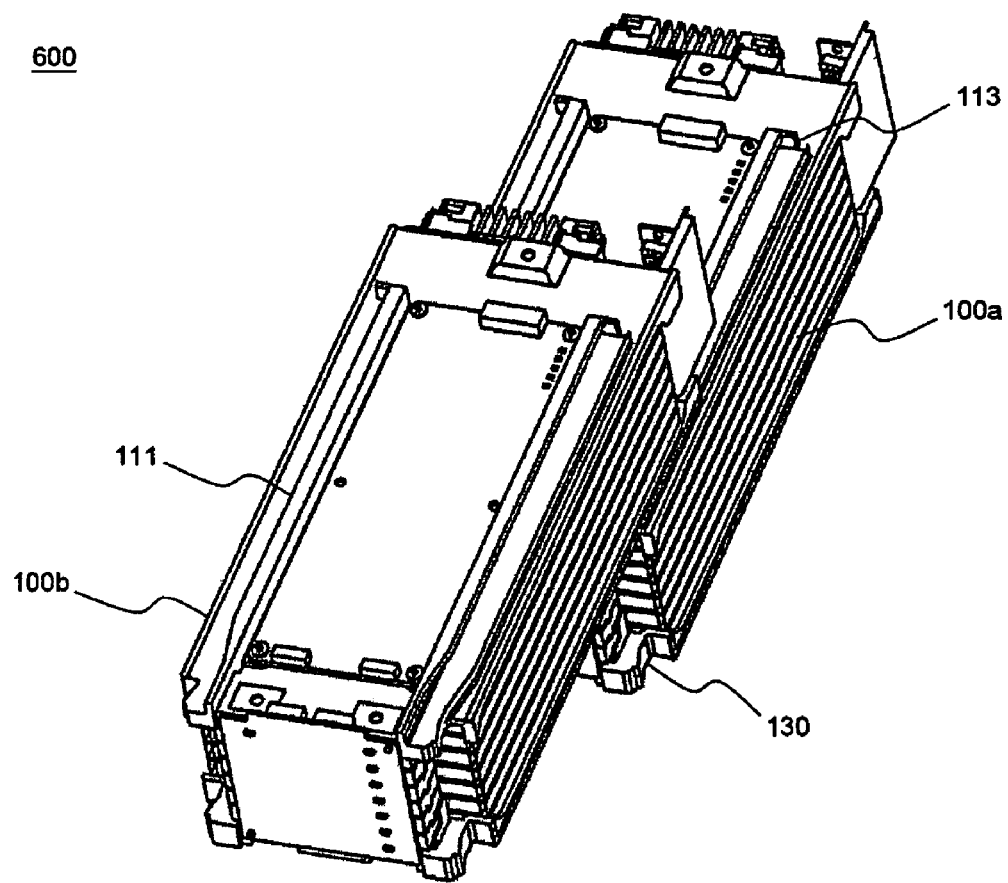
FIGS. 4 and 5 are typical views illustrating a process for stacking a plurality of battery modules in the height direction.
Figure 5:
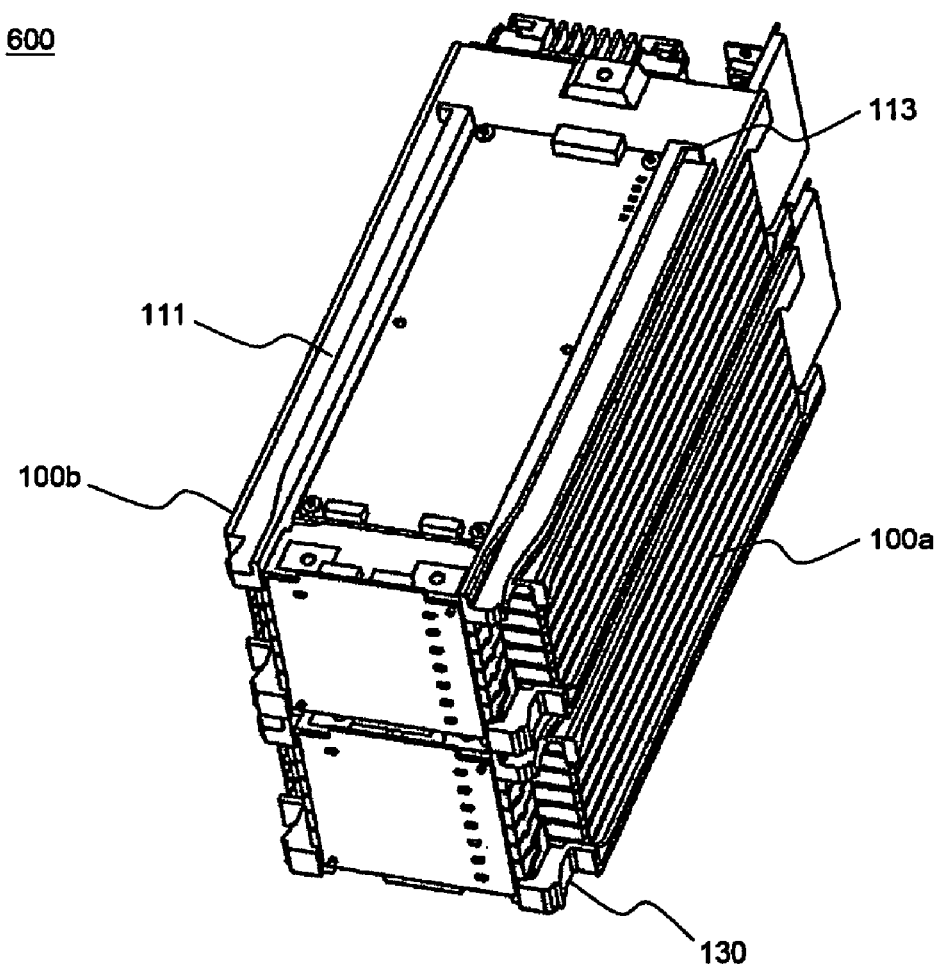

FIGS. 4 and 5 are typical views illustrating a process for stacking two battery modules according to the present invention in the height direction.

Referring first to FIG. 4, the sliding grooves 111 are formed at the top of the module case such that the sliding grooves 111 extend in the longitudinal direction of the module case, and the sliding protrusions (not shown) corresponding to the sliding grooves 111 are formed at the bottom of the module case. Consequently, the two battery modules are coupled in the height direction by the engagement between the sliding grooves 111 and the corresponding sliding protrusions. Specifically, when the battery modules are stacked in the height direction, the sliding protrusions formed at the bottom of the upper battery module 110b are located in the corresponding sliding grooves formed at the top of the lower battery module 110a, and then the upper battery module 110b is slid in the longitudinal direction until the sliding protrusions of the upper battery module 110b reach the stopping walls 113 of the lower battery module 110a. Consequently, the mechanical coupling 600 between the two battery modules is accomplished through the sliding coupling structure without using additional connection members. FIG. 5 illustrates the mechanical coupling 600 between the two battery modules while the two battery modules are stacked in the height direction.

Figure 6:
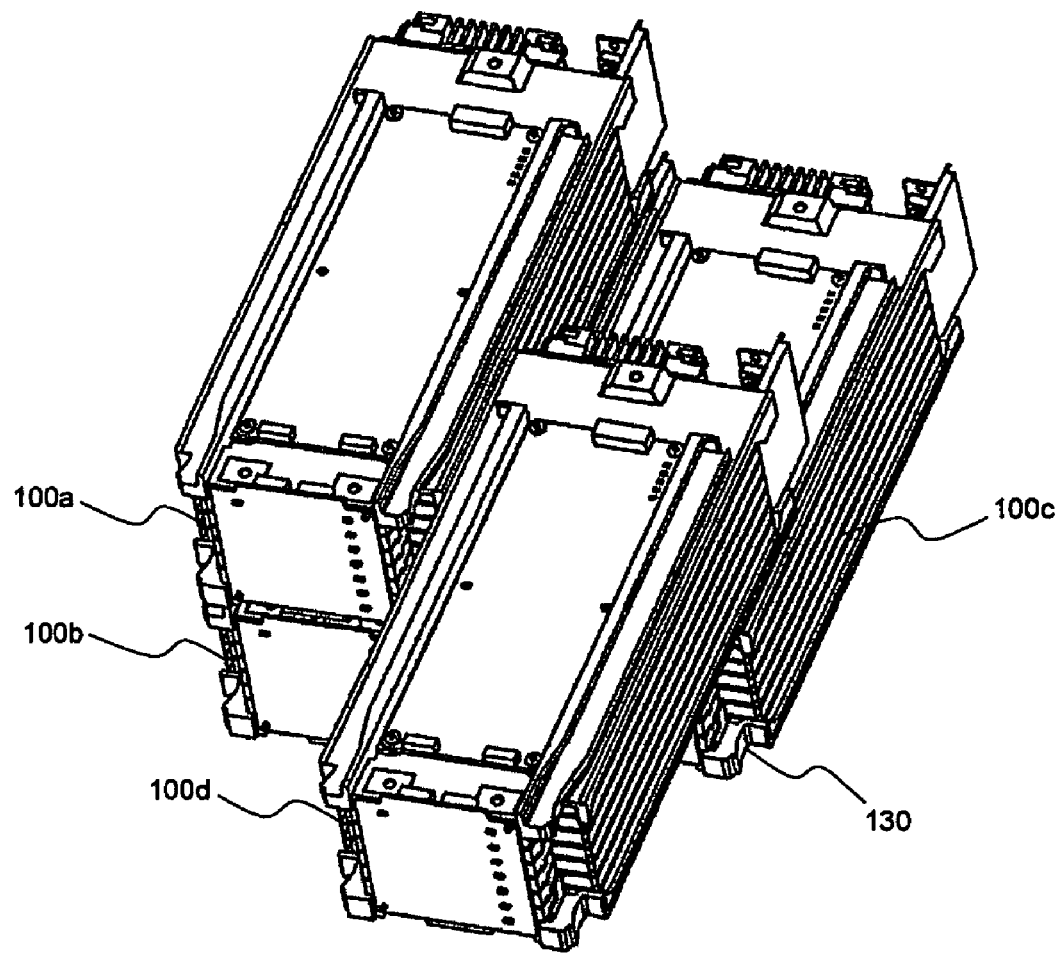
FIGS. 6 and 7 are typical views illustrating a process for stacking a plurality of battery modules not only in the height direction but also in the lateral direction.
Figure 7:
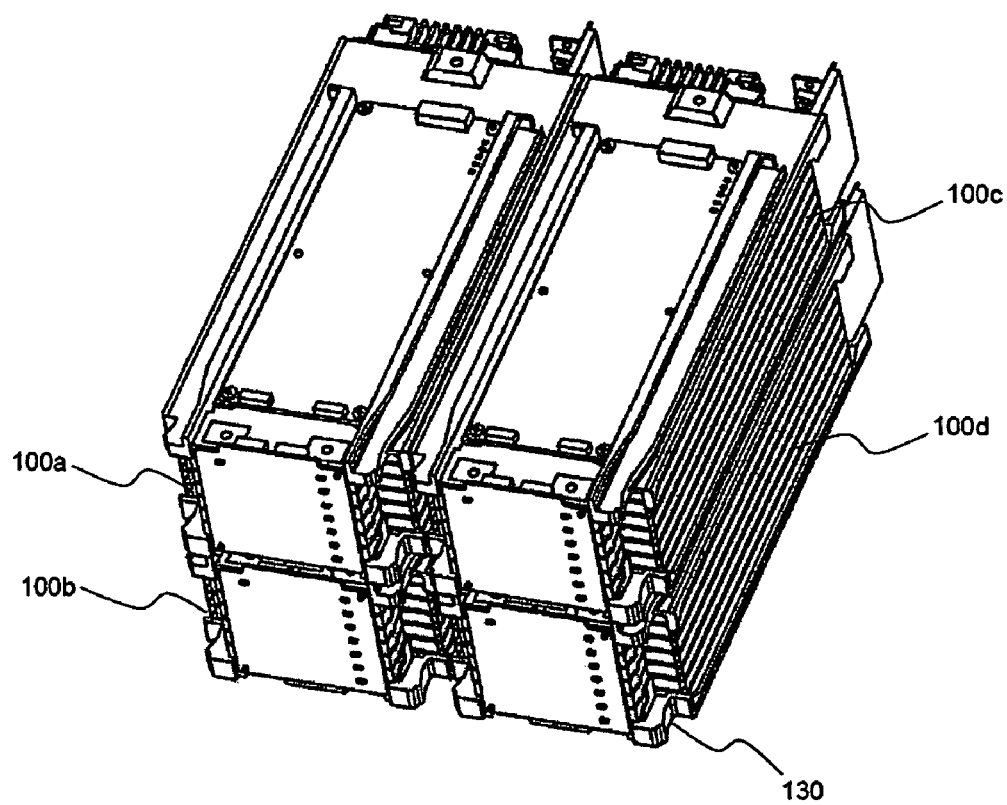

FIGS. 6 and 7 are typical views illustrating a process for stacking a plurality of battery modules not only in the height direction but also in the lateral direction.

First, as shown in FIGS. 4 and 5, battery modules 100a and 100b are stacked in the height direction by the coupling between the battery modules 100a and 100b, and then, as shown in FIGS. 6 and 7, battery modules 100c and 100d are stacked in the height direction by the coupling between the battery modules 100c and 100d at one side of the stacked battery module assembly in the same manner. The battery modules 100c and 100d may be coupled to the battery modules 100a and 100b, or may be in tight contact with the battery modules 100a and 100b while the battery modules 100c and 100d are separated from the battery modules 100a and 100b. In the former structure, it is necessary to form the sliding grooves and the corresponding sliding protrusions at the right and left sides as well as the top and bottom of the battery modules 100a, 100b, 100c, and 100d. However, when the battery modules 100a, 100b, 100c, and 100d have sliding coupling structures at the sides thereof, a precise positional control is required to couple the battery modules 100a, 100b, 100c, and 100d in correct positions. For this reason, it is preferable to use the latter structure in which the battery modules 100c and 100d are in tight contact with the battery modules 100a and 100b while the battery modules 100c and 100d are separated from the battery modules 100a and 100b.

The assembly and disassembly of the battery modules 100a, 100b, 100c, and 100d are easily performed using grips 130 formed at the opposite sides of the front of each battery modules.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery module according to the present invention is constructed in a compact structure and is structurally stable. Also, the mechanical coupling and the electrical connection between the battery modules are accomplished by the sliding coupling between the battery modules, with the result that additional members for the mechanical coupling and the electrical connection between the battery modules are not needed, and therefore, the battery module is effectively mounted in a limited inner space, such as a vehicle. Furthermore, the disassembly and assembly of the battery module are easily performed using the grips formed at the front of the battery module.

What is claimed is:

1. A battery module constructed in a structure in which a plurality of plate-shaped secondary battery cells, which can be charged and discharged, are sequentially stacked on a lower plate, and an upper plate is coupled to an uppermost of the battery cells, wherein the plates are provided at (i) a top and a bottom thereof or (ii) a right side and a left sides thereof, or (iii) the top, the bottom, the right and left sides with a sliding coupling structure, and wherein the battery module comprises:

a rectangular lower case including an upper end receiving part in which the battery cells are sequentially stacked;

a rectangular upper case including a lower end receiving part for covering the battery cells stacked on the lower case;

a first circuit unit for electrically connecting the stacked battery cells to each other, the first circuit unit including a sensing board assembly for detecting voltage and/or current of the battery cells;

a second circuit unit electrically connected to the first circuit unit, the second circuit unit including a main board assembly for controlling overall operation of the battery module; and a third circuit unit electrically connected to the second circuit unit, the third circuit unit connected to an external output terminal while preventing an overcurrent.

2. The battery module according to claim 1, wherein the upper end receiving part and the lower end receiving part correspond to the size of the battery cells such that the battery cells are easily mounted in the respective receiving part.

3. The battery module according to claim 2, wherein the upper and lower cases are constructed in a separate structure in which the upper and lower cases cover the top and bottom of the stacked battery cells, respectively.

4. The battery module according to claim 1, wherein the first circuit unit includes connection terminals for connecting the battery cells in parallel or series with each other, the sensing board assembly of the first circuit unit receives voltage and current signals from the respective battery cells and detects temperatures of the battery cells, and the first circuit unit is mounted to a front of the battery module adjacent to electrode terminals of the battery cells.

5. The battery module according to claim 1, wherein the second circuit unit is mounted to the upper case.

6. The battery module according to claim 1, wherein the third circuit unit includes a switching element for controlling the overcurrent during charge and discharge of the battery cells, and the third circuit unit is mounted at a rear of the battery module opposite' to electrode terminals of the battery cells.

7. The battery module according to claim 1, wherein the sliding coupling structure includes sliding grooves formed at a top of the upper case in a longitudinal direction of the upper case and corresponding sliding protrusions formed at a bottom of the lower case in a longitudinal direction of the lower case.

8. The battery module according to claim 7, wherein the sliding grooves are formed at right and left sides of the top of the upper case, and the sliding protrusions are formed at right and left sides of the bottom of the lower case.

9. The battery module according to claim 8, wherein the sliding grooves and the sliding protrusions are constructed in a linear motion rail and block structure.

10. The battery module according to claim 8, wherein a front end of each sliding groove has a width larger than that of a corresponding sliding protrusion such that an assembly position error is allowed during coupling.

11. The battery module according to claim 8, wherein a front end of each sliding groove is formed at a height larger than that of a corresponding sliding protrusion such that a coupling is maintained.

12. The battery module according to claim 8, wherein each sliding groove is provided at a rear end thereof with a stopping wall for stopping further movement of the corresponding sliding protrusion.

13. The battery module according to claim 1, wherein the lower case is provided at a front thereof with depressed grips.

14. The battery module according to claim 1, wherein the battery module is constructed in a structure in which the first, second, and third circuit units are connected to each other such that the circuit units surround the battery module.

15. A middle- or large-sized battery pack having a high output and large capacity, which includes a plurality of battery modules according to claim 1.

16. An electric or hybrid-electric vehicle including a battery pack according to claim 15 as a charging and discharging power source.

* * * * *

UNITED STATES PATENT AND TRADEMARK OFFICE
CERTIFICATE OF CORRECTION

| | | |
|---|---|---|
| PATENT NO. | : 8,034,476 B2 | Page 1 of 1 |
| APPLICATION NO. | : 12/310872 | |
| DATED | : October 11, 2011 | |
| INVENTOR(S) | : Jin Woong Ha et al. | |

It is certified that error appears in the above-identified patent and that said Letters Patent is hereby corrected as shown below:

Column 8, line 48, delete the word "sides" and insert the word --side--.
Column 9, line 23, delete the """ after the word "opposite".

Signed and Sealed this
Thirteenth Day of November, 2012

David J. Kappos
*Director of the United States Patent and Trademark Office*